May 11, 1948.  E. E. WEMP  2,441,174
TORQUE TRANSMITTING COUPLING
Filed March 24, 1945   6 Sheets-Sheet 1

INVENTOR.
Ernest E. Wemp
BY
Barnes, Kisselle, Laughlin & Raisch
Attorneys

May 11, 1948.  E. E. WEMP  2,441,174
TORQUE TRANSMITTING COUPLING
Filed March 24, 1945  6 Sheets-Sheet 2

INVENTOR.
Ernest E. Wemp
BY

May 11, 1948.   E. E. WEMP   2,441,174
TORQUE TRANSMITTING COUPLING
Filed March 24, 1945   6 Sheets-Sheet 4

INVENTOR.
Ernest E. Wemp
BY
Barnes, Kisselle, Laughlin & Raisch
Attorneys

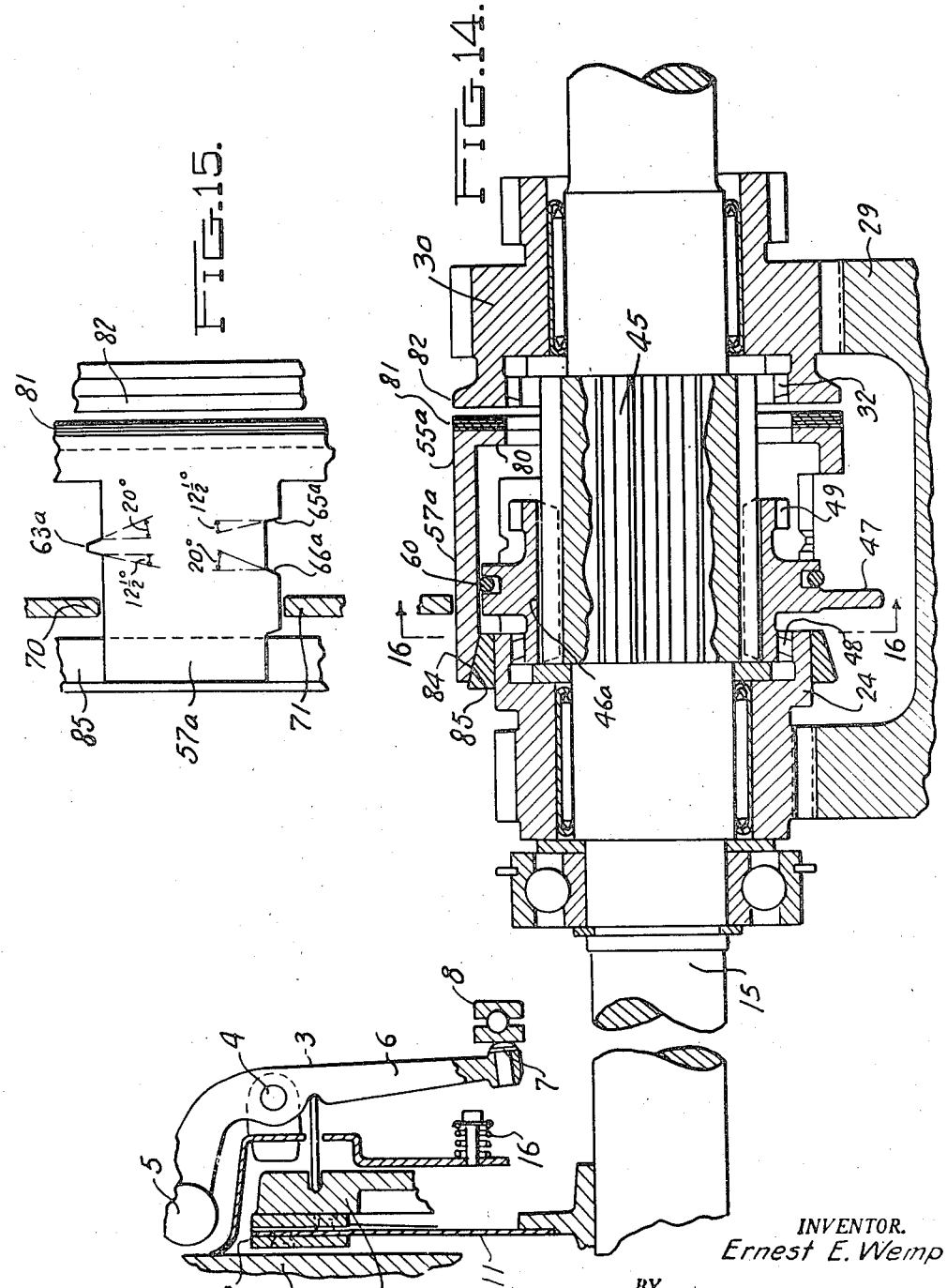

May 11, 1948.    E. E. WEMP    2,441,174
TORQUE TRANSMITTING COUPLING
Filed March 24, 1945    6 Sheets-Sheet 6

INVENTOR.
Ernest E. Wemp
BY
Barnes, Kisselle, Laughlin & Raisch
Attorneys

Patented May 11, 1948

2,441,174

UNITED STATES PATENT OFFICE 2,441,174

TORQUE TRANSMITTING COUPLING

Ernest E. Wemp, Detroit, Mich., assignor of five per cent to Clyde J. Smith, five per cent to Leah Kathleen Smith, twenty per cent to Lilla A. Wemp, all of Detroit, Mich., and five per cent to Eleanor May Wemp, Los Angeles, Calif.

Application March 24, 1945, Serial No. 584,695

13 Claims. (Cl. 192—53)

This invention relates to a power coupling in a torque transmitting line and has to do particularly with an arrangement which may be employed in a transmission for selectively establishing different driving ratios between driving and driven members.

More particularly, the invention is directed to an arrangement where a coupling member is shiftable into dental engagement selectively with two other members which are adapted to rotate at different speeds. In accordance with the invention, the coupling is operable to break the dental engagement with one of the members and to establish a dental engagement with another of the members while the parts of the coupling are under torque load. That is to say, that the parts of the coupling are connected for continued and positive rotation by a driving agency such as an engine, and by a driven agency such as a vehicle, and, accordingly, no other break or discontinuation of the torque transmitting line is needed. Inasmuch as the coupling is for establishing dental engagements with members for effecting different ratios of rotation of the driving and driven members, there are occasions when the action is such that the shiftable element is dentally disengaged from a member which rotates relatively fast and then dentally engaged with a member which rotates relatively slow. On the other hand, the reverse condition is necessary, namely, dental disengagement from the member which rotates relatively slow and dental engagement with the member which rotates relatively fast. In accordance with the invention, the dental engagement which is established with both of said members occurs substantially at the time when the shiftable member and the member to be dentally engaged thereby are substantially sychronized. To this end, a novel arrangement of blocking means is provided for blocking and preventing dental engagement until substantial synchronization occurs. In this connection certain blocking elements are rendered effective because of relative motion reaction in one direction, and other blocking elements are rendered effective because of relative motion reaction in the opposite direction. Accordingly, it will be seen that blocking means are effective to prevent dental engagement in both the situation where the member to be dentally engaged is rotating slower than the coupling element about to engage the same and the situation where the member about to be dentally engaged is rotating faster than the coupling element about to engage the same. This blocking arrangement can be employed in a coupling where a dental engagement is established and disestablished between two members only.

When the structure of this invention is incorporated in the transmission line of an automotive vehicle the shift may be made from a relatively high ratio to a relatively low ratio, or vice versa, at will, and the action of the power coupler may be controlled entirely by the speed control or accelerator of the engine. Since a dental engagement cannot be established at times other than when there is a substantial synchronization of the parts about to be dentally engaged, the function of the power coupler may be controlled by engine speed.

A structure made in accordance with the invention is disclosed in the accompanying drawings. In these drawings:

Fig. 14 is a cross sectional view illustrating a different form of the invention.

Fig. 15 is a developed view illustrating the blocking parts.

Figure 1:
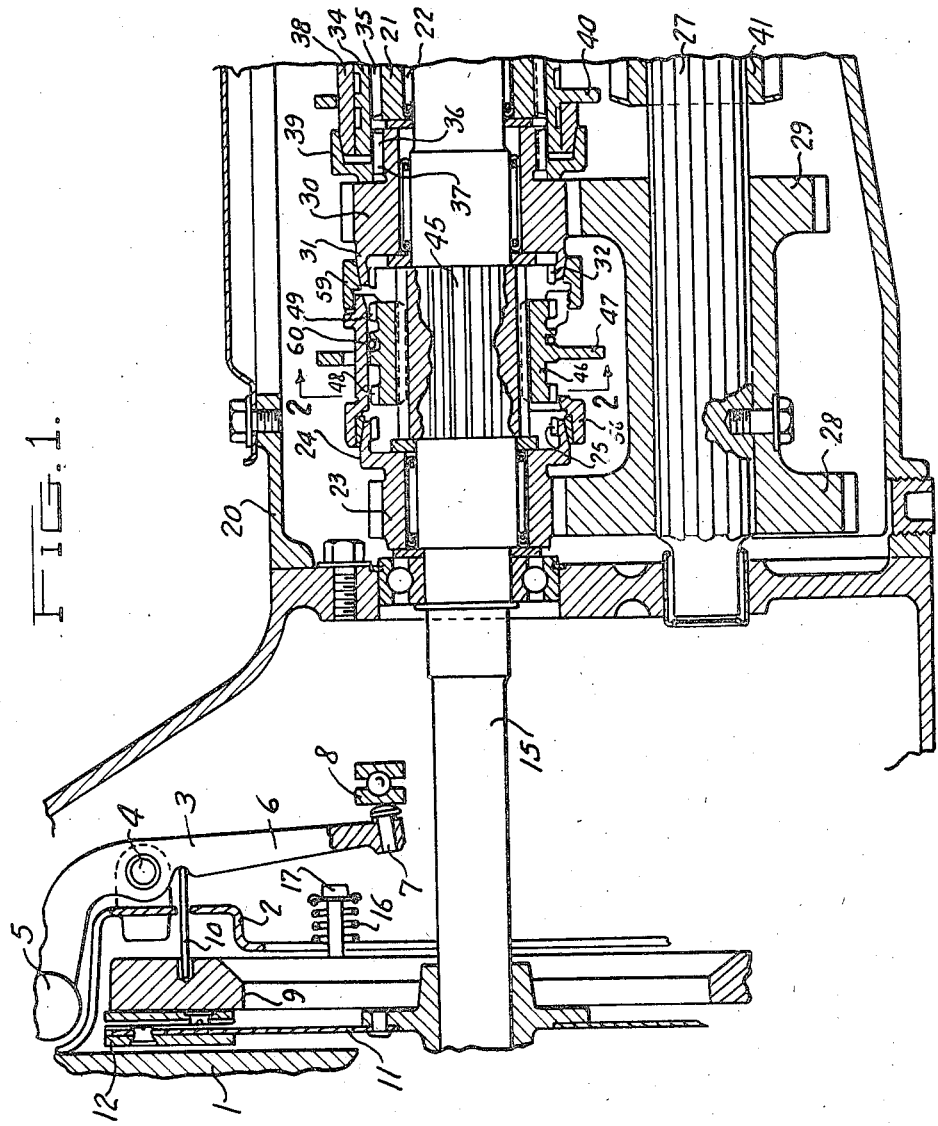
Fig. 1 is largely a sectional view showing the power coupling incorporated in a speed change transmission of an automobile and illustrating how the construction may be employed in conjunction with an automatic clutch.

The invention may advantageously be employed with an automatic clutch, such as a centrifugal clutch, and such a clutch is generally illustrated in Fig. 1. The fly wheel of the engine is shown at 1, attached to which is a cover plate 2. A plurality of levers are fulcrumed on the cover plate as at 4, and each has an unbalanced centrifugal mass 5 and an inwardly extending arm 6 with a tip 7. A thrust bearing is indicated at 8, for swinging the levers for clutch control. A pressure plate 9 is acted upon by the levers through thrust links 10 and a driven disc 11 has facings 12 positioned between the fly wheel and the pressure plate. A hub 13 of the driven disc is mounted in driving relationship on the clutch shaft 15 which, in so far as the transmission is concerned, will hereinafter be termed the driving shaft or member. It will be apparent that upon rotation, the unbalanced mass 5 swings the lever clockwise as Fig. 1 is viewed, and the pressure plate is pushed to the left so that the driven disc is frictionally engaged between the pressure plate and the fly wheel. The pressure plate may be normally retracted by springs 16 acting through studs 17. The clutch is preferably arranged so that it is disengaged at the idling speed of the engine.

The clutch shaft 15 extends into a transmission housing generally illustrated at 20 and the final driven member of the transmission is partially illustrated at 21 in the form of a sleeve over the shaft 15, there being a needle roller bearing at 22. There is a gear 23 journalled on the drive shaft and it has an overhanging part 24 with a tapered or coned exterior surface and a set of internal gear teeth 25. A counter-shaft 27 has a gear cluster thereon with a gear 28, the teeth of which mesh with those of gear 23, and a gear 29, the teeth of which mesh with the teeth on a gear 30 also journalled on the drive shaft. The gear 30 has a tapered or coned extending part 31 with a set of internal teeth 32.

The gear 30 is arranged to be coupled with the final driven member 21. In so far as the present invention is concerned this coupling may be arranged to be established and disestablished. As shown herein a coupling member 34 is slidably splined as at 35 on the driven member 21 and is shiftable so that teeth thereon establish a dental engagement as at 36 with teeth 37 on the gear 30. In the form illustrated, there is a synchronizing element 38 arranged to frictionally engage the internal surface of a friction ring 39 mounted on a gear 30, and the coupling member 38 is shiftable by forces applied to its collar 40. In the position shown, the gear 30 is directly connected to the driven member 21. The transmission may include means whereby the counter-shaft may be coupled to the driven shaft 21 as, for example, through the means of a gear 41 to effect a different driving ratio and when this coupling is made the connection at 36 is broken. In so far as an explanation and a disclosure of the present invention is concerned, it is sufficient to show that the driven member 21 is operated by the gear 30.

Figure 2:
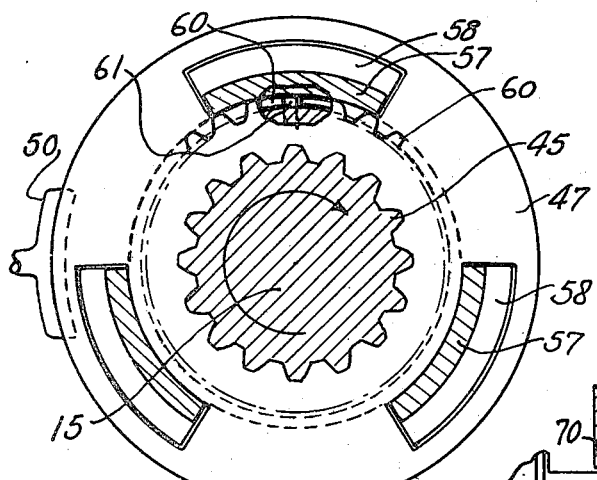
Fig. 2 is a sectional view taken substantially on line 2—2 of Fig. 1 showing some of the coupling structure.
Figure 3:
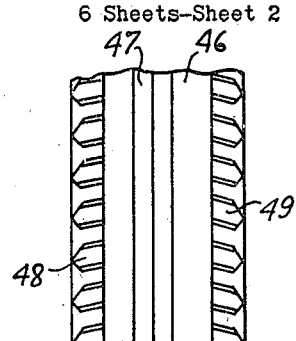
Fig. 3 is a developed plan view illustrating the teeth on the shiftable element of the coupler.
Figure 4:
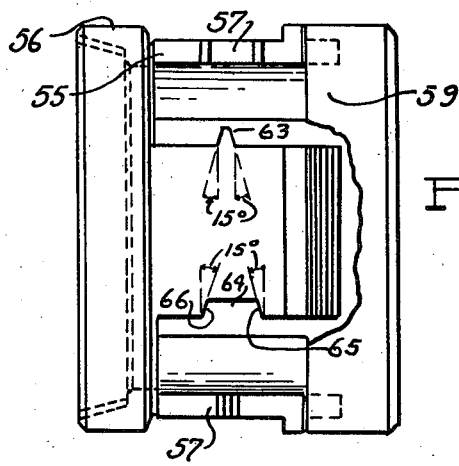
Fig. 4 is a view illustrating an element which incorporates some of the blocking parts.

The driving member 15 is provided with splines 45 and slidably mounted thereon is a shiftable element or coupler 46, with an operating flange 47. This coupler has a set of teeth 48 and a set of teeth 49 for dental engagement respectively with the teeth 25 and 32 of the gear members 23 and 30. The splines 45 are straight so that the coupler has a straight sliding action on the driving member 15, whereas, the cooperating dentally engaging teeth 25 and 48 and the cooperating dentally engaging teeth 49 and 32 are helically disposed. As shown in Fig. 3 the teeth 48 are disposed on a left hand helix while the teeth 49 are disposed on a right hand helix. The teeth 25 are similarly on a left hand helix to match the teeth 48, and the teeth 32 are on a right hand helix to match the teeth 49. The element 46 is shiftable by operating means 50. There is a blocking element 55, as shown in Fig. 4, which overlies the shiftable coupler and which has a ring portion 56 for frictionally engaging the coned surface of the part 24. This blocking member has spaced fingers or projections 57 which pass through openings 58 in the flange 47 and on the end of these projections is secured a friction ring 59 for frictional engagement with the coned portion 31 of the gear member 30. This blocking member and the shiftable coupler 46 are frictionally associated with each other and, as shown in Fig. 1, this is accomplished by means of an expanding spring ring 60 situated in a circumferential groove in the coupler and which expands and engages the inner surface of the several fingers 57. It is to be understood that the member 55 is capable of a small amount of axial movement so that when it engages the surface of the part 24 it is free from the surface of the part 31 and when it engages the part 31 it is free of the part 24. Axial movement of the coupler places an axial load on the member 55 through the means of the friction spring 60. The spring 60 is prevented from rotation relative to the coupler by means of a pin or the like 61 positioned between the ends of the spring as shown in Fig. 2.

Figure 5:
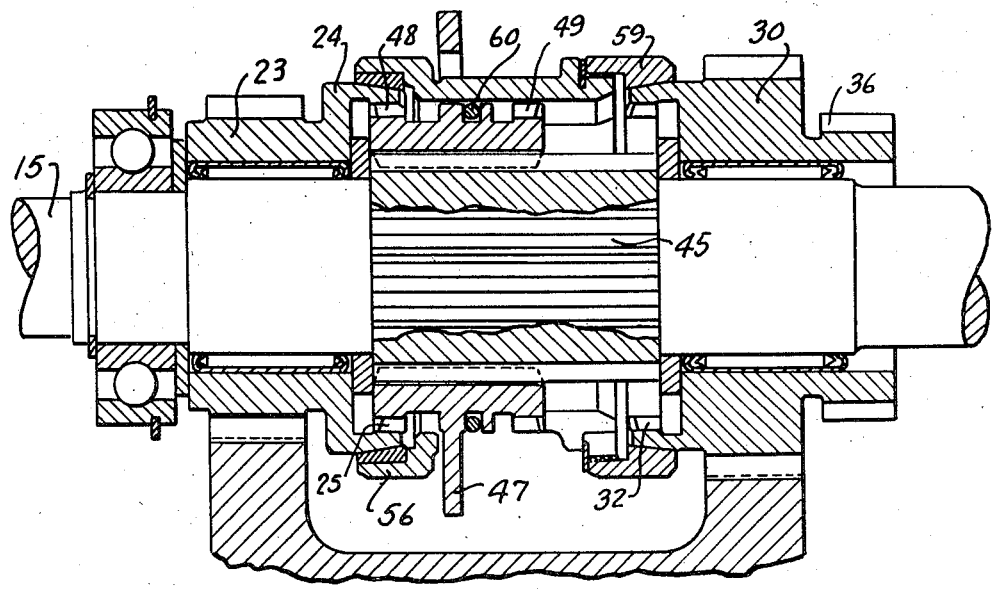
Fig. 5 is a view of the coupler in one dentally engaged position.
Figure 12:
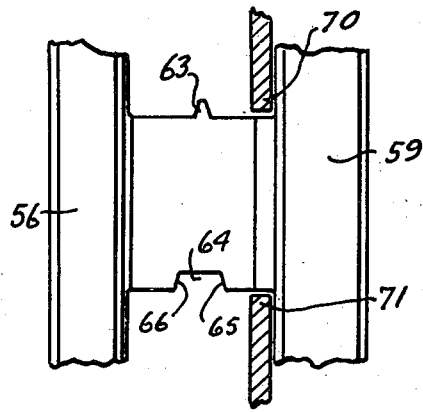
Fig. 12 is a developed view illustrating the relative position of the blocking parts when the coupler is in the Fig. 11 position.
Figure 11:
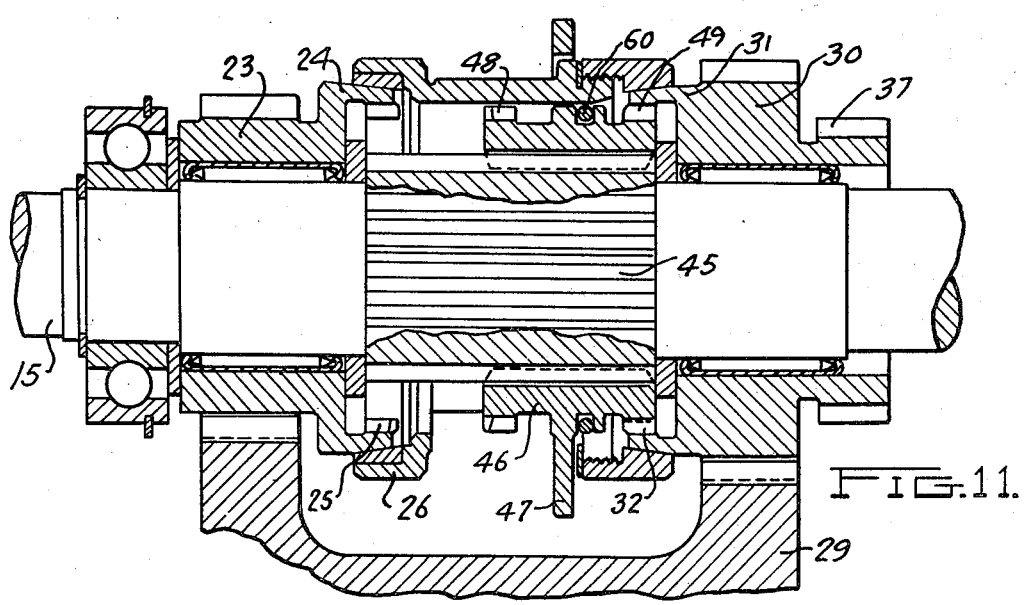
Fig. 11 is a view illustrating the coupler in the other dentally engaged position.

In Fig. 5 the coupler 46 is shown in a position where there is a dental engagement between the teeth 48 and 25. Accordingly, the transmission of torque through the power coupling is as follows: From the driving member 15 to coupler 46, to gear 23, to gear 28, to gear 29, to gear 30, and thence through the dental connection 36 to the driven member 21. It will be observed that in this condition, the driving member 15 and the dentally engaged gear 23 are rotating faster than the gear 30 and driven member 21. In the position shown in Fig. 11 the coupler 46 has a dental engagement with the gear 30 by reason of the teeth 49 and 32. At this time the torque is delivered from the driving member 15 to the coupler 46 to gear 30 and through the connection 36 to the driven member 21. Accordingly, the driving member 15 and the driven member 21 are rotating in unison and there is a 1:1 ratio. This may be considered the relatively high ratio while a relatively low ratio is provided when the coupling is in the condition shown in Fig. 5. When the parts are coupled as shown in Fig. 11, the gear 23 is rotating faster than the gear 30.

The primary objects are to shift the coupler 46 to disestablish the dental engagement with one gear and to establish a dental engagement with the other gear without otherwise breaking or disrupting the torque line; to insure the establishment of a dental connection when there is substantial synchronization and under conditions where at the beginning of a shift the member about to be dentally engaged is rotating faster than the coupler and at the beginning of another shift is rotating slower than the coupler.

Figure 6:
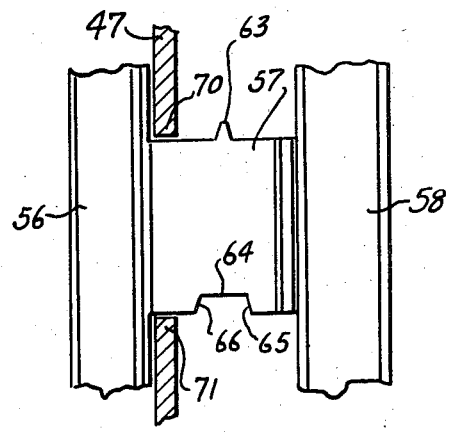
Fig. 6 is a developed view illustrating the relative position of the blocking parts when the coupler is in the position shown in Fig. 5.

To these ends, there is what may be termed a double blocking arrangement disposed in the association between the coupler and the blocking member 55. As shown in Fig. 6, the fingers 57 which pass through the slots or apertures 58 are provided with blocking means in the form of an abutment or projection 63 and a notch or recess 64, the opposite sides of which at 65 and 66 constitute abutment surfaces. The portions of the flange 47 which define the ends of the slots 58 constitute abutment means and are, for convenience, indicated at 70 and 71. It will also be noted that the abutment surfaces of the projection 63 and the notch 64 are inclined for purposes which will presently appear but which may or may not be used with the present invention.

The operation of the structure is as follows:

Let it be assumed that the parts are coupled together as shown in Fig. 5, with the direction of rotation as indicated by the arrow, which is clockwise as Fig. 2 is viewed. The driving member 15 transmits torque to the driven member 21 through the path above described, and the member 21 operates at an R. P. M. lower than the driving shaft. At this time the blocking elements are relatively positioned as shown in Fig. 6. Let it further be assumed that the construction is in an automotive vehicle with the engine coupled to the shaft 15 and the traction wheels of the vehicle coupled to the driven member 21. When a shift of the transmission is to be made an axial force is applied to the flange 47 which would be a force to the right as Fig. 5 is viewed. Preferably, the arrangement is such that the combined loads on the splines 45 and on the dentally engaging teeth 49 and 25 are such that the friction involved prevents shift of the coupler so long as a substantial amount of torque is being delivered. However, as the accelerator on the engine is released to cut the power of the engine the transmission of engine torque to the driven member substantially ceases and the axial load causes the coupling member to shift to the right to disengage the dental engagement with the gear 23. At this moment, as has been above pointed out, the coupler is rotating faster than the gear 30 because it has just been released from the faster rotating gear 23. As the coupler shifts to disestablish the dental engagement, the frictional engagement caused by the spring 60 places an axial load to the right on the element 55. This establishes a frictional engagement between the ring 59 and the slower rotating gear 30.

Figure 7:
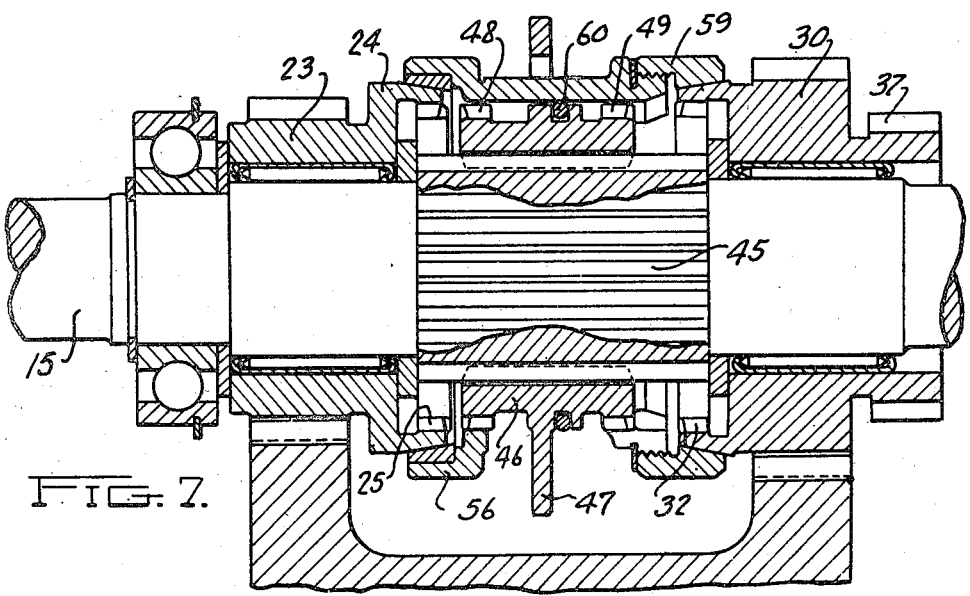
Fig. 7 is a view of the coupler showing the same in one neutral position.
Figure 10:
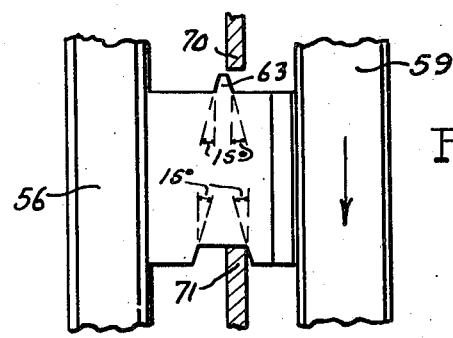
Fig. 10 is a developed view illustrating the blocking action which may occur when the coupler is in the Fig. 9 position.

Accordingly, the member 55 tends to decelerate due to the control action of the gear 30, whereas the coupler 46 continues rotating faster with the driving member 15. There is, accordingly, a reaction of relative motion as indicated by the arrow in Fig. 8. And the abutment 70 strikes the abutment 63 and prevents further movement of the coupler. This condition will be maintained so long as this relative motion reaction persists. The parts are now in a position as shown in Fig. 7 with the coupler blocked against further movement to the right and with the coupler disengaged from both gear members. Normally, this condition will not be maintained for a long period since the accelerator of the engine or the power of the engine has been cut and the engine and, therefore, the shaft 15 is decelerating. Normally, the engine will decelerate rather rapidly and when it passes through the point of synchronization and begins to rotate slower than the gear 30, the reaction of the relative motion is reversed as indicated in Fig. 10. Accordingly, as Fig. 10 is viewed, the member 55 tends to move downwardly while the flange 47 tends to move upwardly. The abutment 70 will, therefore, move over the abutment 63 but the abutment 71 will engage the abutment 65 as indicated.

Figure 8:
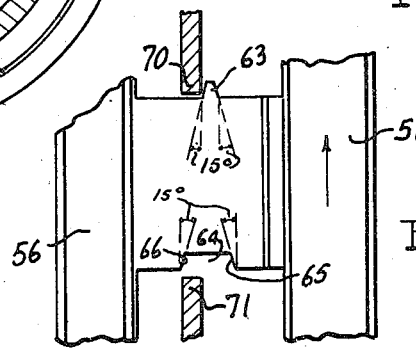
Fig. 8 is a developed view illustrating the blocking action for holding the coupler in the Fig. 7 position.
Figure 9:
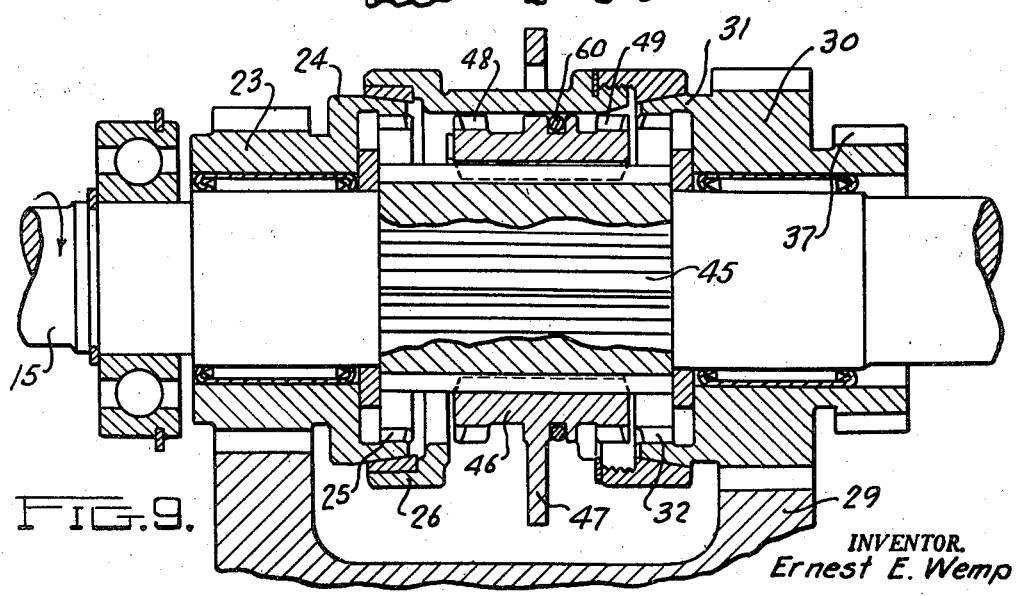
Fig. 9 is a sectional view showing the coupler in another neutral position.

This condition will be maintained as long as a condition persists in which the driving member 15 is rotating slower than the member 30, which is about to be dentally engaged. The parts are now in the position as shown in Fig. 9 with the coupler moved slightly to the right from the position shown in Fig. 7, but with the coupler still in a neutral position. As the accelerator of the engine is depressed, and the speed of the engine increases, the driving member 15 will first come up to a point of substantial synchronization with the gear 30 and then as the driving member 15 tends to overrun the member 30 the relative motion reaction, as indicated in Fig. 10, ceases and may even reverse, or tend to reverse, to the condition shown in Fig. 8, with the result that the abutment 71 moves over the abutment 65 and the teeth 49 move into dental engagement with the teeth 32 and the parts are then coupled, as shown in Fig. 11. Thus, the dental engagement is established substantially when the coupler and the member 30 are synchronized. More specifically, the coupling is established just as the coupler 46 starts to rotate faster than the member 30, which, however, is when they are substantially synchronized. All during the action the member 30 has been positively connected to and driven by the traction wheels of the vehicle and the coupler 46 has been connected to and driven by the engine of the vehicle and, therefore, the parts are under what is termed torque load.

This shift in the transmission is obtained by first applying the axial load to the control flange 47 followed by the simple action of releasing the accelerator and then depressing the accelerator. Now, it may be possible that the coupler will not stop in the position shown in Figs. 9 and 10 under certain conditions. For instance, suppose the engine is controlled so that the driving member very slowly decelerates when the parts are in the position shown in Figs. 7 and 8; when the engine and driving member 15 become substantially synchronized with the gear 30 the reaction of relative motion, indicated in Fig. 8, is lost but there is not a sufficient differential in the speeds of rotation to establish the condition shown in Fig. 10. Under these conditions, the coupler may move directly into the coupled position shown in Fig. 11. However, this is a perfectly satisfactory and proper operation because the conditions for the establishment of a dental engagement are satisfied, namely, substantial synchronization of the two parts about to be dentally engaged.

Figure 13:
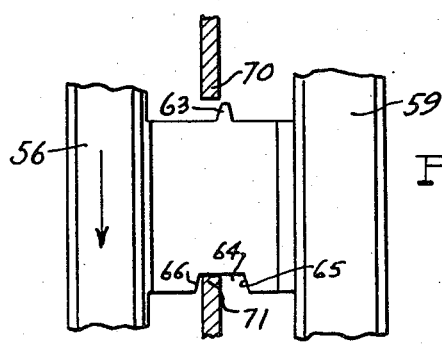
Fig. 13 is a view similar to Fig. 12 illustrating the blocking action which occurs in the course of a shift of the coupler from the Fig. 11 position back to the Fig. 5 position.

Now, let it be assumed that it is desired to shift the coupling from the Fig. 11 position to the Fig. 5 position. First, an axial force is applied to the flange 47 tending to shift the same to the left. When the torque of the engine is sufficiently cut the force will shift the coupler to the left and disestablish the dental engagement between the teeth 49 and the teeth 32. In this action the frictional engagement caused by the spring 60 shifts the member 55 to the left and into frictional engagement with the part 24 of the gear 23. At the moment of disengagement of the teeth 49 and the teeth 32, the coupler 46 is rotating slower than the gear 23 because it has just been released from the slower running gear 30. Likewise, the driving shaft 15 and the engine are operating slower than the gear 23. Accordingly, there is a reaction caused by the relative motion as indicated in Fig. 13. This reaction is similar to the reaction indicated in Fig. 10 but in this case the abutment 71 moves into the notch 64 and engages the abutment shoulder 66. This condition will be maintained so long as the engine and, therefore, the driven shaft is rotating slower than the gear 23. The speed of the gear 23 persists fairly constantly because it is coupled to the traction wheels of the vehicle, through gears 28, 29 and 30. As the driving shaft speed is increased, as by means of depressing the accelerator of the engine, it will come up to the speed of the member 23 and then as it tends to overrun the same the relative motion reaction, as shown in Fig. 13, is lost or it may be reversed with the result that the abutment 71 moves over the abutment 66 and the coupler shifts to cause a dental engagement of the teeth 48 with the teeth 25, as shown in Fig. 5. This takes place when there is a substantial synchronization in the coupler and the member 23. Usually the abutment 63 will not function in this shift with this type of transmission.

The purpose of having the dentally engaging teeth disposed helically is to provide for movement of the coupler into and out of dental engagement. The coupler shifts on the straight splines 45; the dental engagement between the teeth 49 and teeth 32 takes place as the coupler tends to overrun the gear 30 and the teeth 49 move into teeth 32 with a sort of screw-like motion. Likewise, the dental engagement with the member 24 is established as the coupler starts to overrun the member 23 and the teeth 48 move into dental engagement with the teeth 25 with a sort of screw-like motion as the coupler shifts on the straight splines 45. The reverse takes place upon disengagement of the teeth.

At this point, the function of the inclined blocking surfaces 65 and 66 and the inclined blocking surface of the projection 63 may be brought out. The function of these surfaces cooperate with an automatic clutch such as the centrifugal clutch, shown in Fig. 1. Let it be presumed that the parts are in the position shown in Figs. 9 and 10 with the engine running slower than the member 30; the relative motion reaction indicated in Fig. 10 will persist as long as the engine continues to run slower than member 30. If the engine is stopped, or if it decelerates to the point where the centrifugal clutch opens, then we have a condition where the parts to be dentally engaged are not under torque load. In other words, the driving shaft 15 and the coupler become free and are not engine controlled. Being free, these parts can be easily oscillated and the axial load on the control flange 47, if the axial load be maintained, will cause the abutment 71 to ride over the inclined abutment face 65 with cam-like action so that the coupler moves to the engaged position shown in Fig. 11. On the other hand, suppose the load on the coupler is to the left and the condition is as indicated in Fig. 13, where the engine is rotating slower than the member 23. If the engine is stopped or is decelerated to a point where the centrifugal clutch opens, the coupler becomes free and the abutment 71 is caused to move cam-fashion over the inclined abutment face 66. Therefore, there is assurance that any time the engine is stopped and the vehicle parked or allowed to stand idle that the power coupler will be in a coupled condition.

Figure 16:
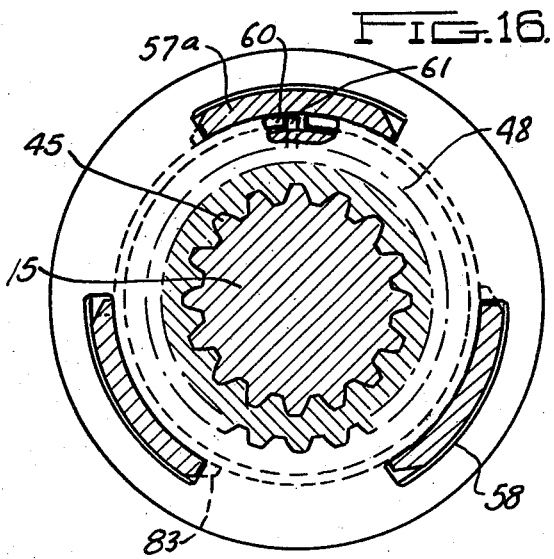
Fig. 16 is a sectional view taken substantially on line 16—16 of Fig. 14.

Most of the elements in the form shown in Figs. 14, 15 and 16 are the same as those previously described and, accordingly, the same reference characters are applied and thus a second detailed description becomes unnecessary. A centrifugal clutch is illustrated for use in conjunction with the coupler. This is shown on a relatively reduced scale and has the same reference characters as are applied to the clutch shown in Fig. 1. The shiftable coupler is the same in principle as the one previously described although it is shortened axially and is illustrated at 46a with its flange 47. It has teeth 49 for engagement with teeth 32 of gear 30 and teeth 48 for engagement with teeth 25 of the gear 23.

In this form the blocking member 55a and some of the cooperating parts are of modified form. The blocking member 55a is constructed in the form of a tube or sleeve. One end of the sleeve is fashioned to provide a flange 80 for the mounting of suitable friction material 81 which is of flat form and has a radial face. The gear 30 is provided with a cooperating engagement portion 82 with a radial face for engaging the material 81. The tubular structure is slabbed off, removing segments thereof, so to speak, leaving the projecting fingers 57a as shown in Fig. 16, which pass through the apertures 58 in the coupler flange 47. The dotted lines 83, in Fig. 16, indicate the line of cut and the tapering edges are cut off to shape up the edges. The free ends of these fingers are provided with a bevel formation on their inner faces, as shown at 84, for frictionally engaging a ring of suitable frictional material, such as a bronze or the like 85, preferably press fitted onto the part 24 of the gear 23.

The blocker elements on the blocker member 55a are varied as shown in Fig. 15. In this case the blocking shoulder 65a and the blocking side 65' of the projection 63a are at a relatively steep angle, whereas the blocking shoulder 66a is at a more acute angle to provide for an automatic engagement of the teeth 25 and 48 when the centrifugal clutch opens.

Generally speaking, this construction functions the same as the one previously described. When force is applied to the coupler to shift it to the right as Fig. 14 is viewed, the blocking shoulder 70 strikes the tooth 63a in the manner as shown in Fig. 8. As the engine decelerates and passes through the point of synchronization to a slower R. P. M. the direction of relative motion reaction reverses and the blocking shoulder 71 abuts a blocking shoulder 65a as shown in Fig. 10. Then as the engine accelerates to the point where it tends to overrun the member 30 the blocking position, shown in Fig. 10, is released and the teeth 49 move into dental engagement with the teeth 32. In this operation the friction material 81 is frictionally engaged with the face of element 82 and, accordingly, causes the relative oscillation between the blocking element 57a and the coupler 46a to provide the blocking actions just described. Of course, there is an axial load on the coupler to the right, as Fig. 14 is viewed, during this operation, but the angles of the blocking faces 65' and 65a are relatively steep and the torque capacity of the frictional clutching engagement between parts 81 and 82 need be only very light to provide and maintain these blocking actions. Indeed, the blocking faces 65' and 65a may be substantially perpendicular to the axis although some angularity is probably preferred because of easing the action as the blocking action is discontinued and the coupler moves to the right with the blocking shoulders moving over the inclined blocking abutments.

Normally, a coupled up or dental engagement is required in only one position under those conditions where the centrifugal clutch opens because of deceleration or stopping of the engine and this is performed only by the blocking shoulder 66a. When the coupler is being moved to the right the relative motion reaction will be as indicated in Fig. 13 with the shoulder 71 engaging the shoulder 66a, which is inclined at a more acute angle. This will serve to provide the blocking action which becomes unblocked when the engine is accelerated and tends to overrun the coupler. However, if the engine decelerates to a point where the clutch opens, or if it completely stops operating, then the shaft 15 and clutch driven member become free. The axial load on the coupler acting through the inclined shoulder 66a then rocks the freed parts with a cam-like action and the blocking shoulder 71 moves over and out of engagement with the shoulder 66a and the parts become coupled as shown in Fig. 14. Due to the incline of the shoulder 66a a greater amount of torque is needed to maintain the blocking action and this is accomplished by the cone clutching agencies 84 and 85. Needless to say, the energizing torque is supplied through the action of the expanding spring 60.

There has been described a situation where only two gear ratios are established. This is because the driven member 21 has been shown as remaining connected to the member 30 through the dental engagement at 36. Other ratios may be provided by manipulation of the shiftable coupling element 34. This, however, is not shown in full herein but such an arrangement is disclosed in pending application Serial No. 563,482, filed November 15, 1944.

I claim:

1. In a torque transmitting mechanism, a power transmitting member, two power transmitting elements adapted to rotate at different relative speeds, a shiftable coupler in driving relationship with the power transmitting member, cooperating teeth on the coupler and one element arranged for dental engagement when the coupler is in one position, cooperating teeth on the coupler and the other element arranged for dental engagement when the coupler is in another position, means for applying a shifting force on the coupler, and double blocking means for blocking the coupler in two different axial positions in its axial movement from one element to the other and operable respectively by opposite relative motion reaction due to different speeds of rotation of the coupler and the element about to be dentally engaged and releasable when the coupler and the element about to be dentally engaged become substantially synchronized.

2. In a torque transmitting mechanism, a power transmitting member, two power transmitting elements adapted to rotate at different relative speeds, an axially shiftable coupler in driving relationship with the power transmitting member, cooperating teeth on the coupler and one element arranged for dental engagement when the coupler is in one position, cooperating teeth on the coupler and the other element arranged for dental engagement when the coupler is in another position, means for applying a shifting force on the coupler, and double blocking means for blocking the coupler in two different axial positions in its axial movement from one element to the other and operable respectively by opposite relative motion reaction incident to different speeds of rotation of the coupler and the element about to be dentally engaged and releasable when the coupler and the element about to be dentally engaged become substantially synchronized.

3. In a torque transmitting mechanism, a power transmitting member, two elements adapted to rotate at different relative speeds of rotation, a coupler slidably connected to the power transmitting member, the coupler and the two elements having teeth for dental engagement, means for applying shifting force to the coupler for shifting the same into and out of dental engagement selectively with the said two elements, and double blocking means operative when the coupler is shifting from dental engagement with the faster rotating element to dental engagement with the slower rotating element, one of the blocking means being effective upon relative motion reaction due to rotation of the coupler faster than the element about to be dentally engaged and the other being operative upon relative motion reaction due to rotation of the coupler slower than the element about to be engaged and both being releasable when the coupler and element about to be engaged become substantially synchronized.

4. In a torque transmitting mechanism, a power transmitting member, two elements adapted to rotate at different relative speeds of rotation, a coupler slidably connected to the power transmitting member for axial shifting movement, the coupler and the two elements having teeth for dental engagement, means for applying shifting force to the coupler for shifting the same into and out of dental engagement selectively with the said two elements, and double blocking means operative when the coupler is shifting from dental engagement with the faster rotating element to dental engagement with the slower rotating element for blocking movement of the coupler in two axial positions in both of which the coupler is disengaged from both of said elements, one of the blocking means being effective upon relative motion reaction due to rotation of the coupler faster than the element about to be dentally engaged and the other being operative upon relative motion reaction due to rotation of the coupler slower than the element about to be engaged and both being releasable when the coupler and element about to be engaged become substantially synchronized.

5. In a torque transmitting mechanism, a driving member, a driven member, means for coupling the members together at different speed ratios including two elements geared together for different relative speeds of rotation and arranged to be coupled with one member and including a coupler slidably connected to the other member, the coupler and the two elements having teeth for dental engagement, means for applying shifting force to the coupler for shifting the same into and out of dental engagement selectively with the said two elements, double blocking means operative when the coupler is shifting from dental engagement with the faster rotating element to dental engagement with the slower rotating element, one of the blocking means being effective upon relative motion reaction due to rotation of the coupler faster than the element about to be dentally engaged and the other being operative upon relative motion reaction due to rotation of the coupler slower than the element about to be engaged and both being releasable when the coupler and element about to be engaged become substantially synchronized, and blocking means functioning when the coupler is moving from dental engagement with the slower rotating element to engagement with the faster rotating element and operative by relative motion reaction when the coupler is rotating slower than the element about to be engaged and releasable when the coupler and the element about to be dentally engaged become substantially synchronized.

6. In a torque transmitting mechanism, two elements arranged to operate at different speeds of rotation and each having teeth for dental engagement, a coupler having teeth for dental engagement with the two elements and shiftable from a position of dental engagement with one element to a position of dental engagement with the other element, means for applying shifting force to the coupler, blocking means for blocking the movement of the coupler as it moves from dental engagement with the faster rotating element toward the slower rotating element and operable by relative motion reaction due to the relatively fast speed of rotation of the coupler, other blocking means axially spaced from the first named blocking means for blocking movement of the coupler toward the slower rotating element and operable by relative motion reaction effective as the coupler decelerates through the point of synchronization with the slower rotating element to a speed of rotation lower than that of the slower rotating element, said last named blocking means being releasable as the coupler accelerates and tends to overrun the slower rotating element for movement of the coupler into dental engagement with said slower rotating element.

7. In a torque transmitting mechanism, two torque transmitting elements arranged so that one rotates relatively fast and the other relatively slow, the elements having teeth for dental engagement, a coupler having teeth for dental engagement with the elements and shiftable into positions for selectively dentally engaging the elements, means for applying shifting force to the coupler and two sequentially operating blocking means effective upon the coupler in its movement from dental engagement with the faster rotating element into dental engagement with the slower rotating element, the first acting blocking means being operative by relative motion reaction due to the rotation of the coupler at a higher speed than the slower rotating element, the second acting blocking means being operative by relative motion reaction due to rotation of the coupler at a lower speed than the slower rotating element, both of said blocking means being releasable when the relative motion reaction is lost by substantial synchronization of the coupler and the slower rotating element.

8. In a torque transmitting mechanism, two torque transmitting elements arranged so that one rotates relatively fast and the other relatively slow, the elements having teeth for dental engagement, a coupler having teeth for dental engagement with the elements and shiftable into positions for selectively dentally engaging the elements, means for applying shifting force to the coupler and two sequentially operating blocking means effective upon the coupler in its movement from dental engagement with the faster rotating element into dental engagement with the slower rotating element, the first acting blocking means being operative by relative motion reaction due to the rotation of the coupler at a higher speed than the slower rotating element, the second acting blocking means being operative by relative motion reaction due to rotation of the coupler at a lower speed than the slower rotating element, both of said blocking means being releasable when the relative motion reaction is lost by substantial synchronization of the coupler and the slower rotating element, and blocking means acting upon the coupler in its movement from dental engagement with the slower rotating element to dental engagement with the faster element and operative by relative motion reaction due to rotation of the coupler at a speed lower than the faster rotating element, said last named blocking means being releasable as the coupler tends to overrun the faster rotating element.

9. In a torque transmitting mechanism, a driving shaft, a driven shaft, two gears coupled together for rotation at different speeds, means for connecting the gears in driving relationship with the driven shaft, said gears being axially spaced on the axis of the driving shaft, a coupler slidably splined on the driving shaft and disposed between the spaced gears, the gears and the coupler having dentally engaging teeth and the coupler being shiftable for dental engagement respectively with the gears, means for applying shifting force to the coupler, two sequentially operating blocking means effective upon the coupler in its shift from dental engagement with the faster rotating gear to dental engagement with the slower rotating gear, the first of which is operative by relative motion reaction due to the relatively fast rotation of the coupler and the second of which is operative by the opposite relative motion reaction, whereby the coupler may decelerate through the point of synchronization with the slower rotating element to a lower speed, the said second blocking means being releasable when the coupler accelerates and tends to overrun the slower rotating gear for dental engagement therewith substantially upon synchronization.

10. In a torque transmitting mechanism, a driving shaft, a driven shaft, two gears coupled together for rotation at different speeds, means for connecting the gears in driving relationship with the driven shaft, said gears being axially spaced on the axis of the driving shaft, a coupler slidably splined on the driving shaft and disposed between the spaced gears, the gears and the coupler having dentally engaging teeth and the coupler being shiftable for dental engagement respectively with the gears, means for applying shifting force to the coupler, two sequentially operating blocking means effective upon the coupler in its shift from dental engagement with the faster rotating gear to dental engagement with the slower rotating gear, the first of which is operative by relative motion reaction due to the relatively fast rotation of the coupler and the second of which is operative by the opposite relative motion reaction, whereby the coupler may decelerate through the point of synchronization with the slower rotating element to a lower speed, the said second blocking means being releasable when the coupler accelerates and tends to overrun the slower rotating gear for dental engagement therewith substantially upon synchronization, and blocking means effective upon the coupler in its shift from dental engagement with the slower rotating gear to dental engagement with the faster rotating gear and operative by relative motion reaction due to rotation of the coupler at a speed lower than that of the faster rotating gear and being releasable as the coupler tends to overrun the faster rotating gear.

11. In a torque transmitting mechanism, a power transmitting member, a power transmitting element, a coupler slidably connected in driving relationship with the member, cooperating teeth on the coupler and element arranged to be brought into and out of dental engagement by the shift of the coupler, means for applying shifting force to the coupler, and double blocking means for blocking the coupler in its movement from a position of disengagement with the element to a position of dental engagement with the element and operable respectively by opposite relative motion reaction incident to dissynchronization of the coupler and the element and releasable when the coupler and the element become substantially synchronized.

12. In a torque transmitting mechanism, a power transmitting member, a power transmitting element, a coupler slidably connected in driving relationship with the member, cooperating teeth on the coupler and element arranged to be brought into and out of dental engagement by the shift of the coupler, means for applying shifting force to the coupler, and double blocking means for blocking the coupler in two different axial positions in its movement from a position of disengagement to a position of dental engagement with the element and operable by opposite relative motion reaction incident to dis-synchronization of the coupler and the element and releasable when the coupler and element become substantially synchronized.

13. In a torque transmitting mechanism, a power transmitting member, a power transmitting element, a coupler slidably connected in driving relationship with the member, cooperating teeth on the coupler and element arranged to be brought into and out of dental engagement by the shift of the coupler, means for applying shifting force to the coupler, and two sequentially operating blocking means for blocking the coupler in its movement from a position of disengagement to a position of dental engagement with the element, one blocking means being operable by relative motion reaction due to rotation of the said element faster than the said member and the other being operable due to rotation of the said member faster than the said element and both being releasable when the element and member become substantially synchronized.

14. In a torque transmitting mechanism, a power transmitting member, a power transmitting element, a coupler slidably connected in driving relationship with the member, cooperating teeth on the coupler and element arranged to be brought into and out of dental engagement by the shift of the coupler, means for applying shifting force to the coupler, blocking means having two sequentially operating blocking agencies, means for establishing a frictional engagement between the blocking means and the element for setting up relative motion reaction therebetween incident to different speeds of rotation of the element and coupler, one blocking agency being effective when the relative motion reaction is in one direction and the other being effective when the relative motion reaction is in the opposite direction and both being releasable when the element and coupler become substantially synchronized.

15. In a torque transmitting mechanism, a power transmitting member, a power transmitting element, a coupler slidably connected in driving relationship with the member, cooperating teeth on the coupler and element arranged to be brought into and out of dental engagement by the shift of the coupler, means for applying shifting force to the coupler, double blocking means for blocking the coupler in its movement from a position of disengagement with the element to a position of dental engagement with the element and operable respectively by opposite relative motion reaction and releasable when the coupler and the element become substantially synchronized, and means for establishing relative motion reaction as the coupler is shifting in a direction away from dental engagement with said element whereby to render one of said blocking means ineffective.

16. In a torque transmitting mechanism, a power transmitting member, a power transmitting element, a coupler slidably connected in driving relationship with the member, cooperating teeth on the coupler and element arranged to be brought into and out of dental engagement by the shift of the coupler, means for applying shifting force to the coupler, double blocking means for blocking the coupler in its movement from a position of disengagement with the element to a position of dental engagement with the element and operable respectively by opposite relative motion reaction and releasable when the coupler and the element become substantially synchronized, and a member arranged to be frictionally engaged to establish relative motion reaction as the coupler is shifting in a direction away from dental engagement with said element whereby to render one of said blocking means ineffective for blocking the coupler in the last said direction of shift.

ERNEST E. WEMP.

REFERENCES CITED

The following references are of record in the file of this patent:

UNITED STATES PATENTS

| Number | Name | Date |
|---|---|---|
| 1,761,966 | Blackmore | June 3, 1930 |
| 2,245,816 | Peterson | June 17, 1941 |
| 2,369,843 | Neracher et al. | Feb. 20, 1945 |
| 2,376,512 | Schatz | May 22, 1945 |
| 2,391,268 | Peterson et al. | Dec. 18, 1945 |